(12) United States Patent
Holder

(10) Patent No.: US 10,315,778 B2
(45) Date of Patent: Jun. 11, 2019

(54) AIRPLANE STATUS SYSTEM

(71) Applicant: The Boeing Company, Chicago, IL (US)

(72) Inventor: Barbara E. Holder, Seattle, WA (US)

(73) Assignee: The Beoing Company, Chicago, IL (US)

( * ) Notice: Subject to any disclaimer, the term of this patent is extended or adjusted under 35 U.S.C. 154(b) by 111 days.

(21) Appl. No.: 14/865,794

(22) Filed: Sep. 25, 2015

(65) Prior Publication Data

US 2017/0088284 A1    Mar. 30, 2017

(51) Int. Cl.
*B64D 45/00* (2006.01)
*B64D 43/00* (2006.01)
*G01C 23/00* (2006.01)

(52) U.S. Cl.
CPC .......... *B64D 45/00* (2013.01); *B64D 43/00* (2013.01); *G01C 23/005* (2013.01)

(58) Field of Classification Search
CPC ....... B64D 45/00; B64D 43/00; G01C 23/005
USPC .... 340/933, 969, 971, 973, 978, 946; 701/7, 701/9, 14
See application file for complete search history.

(56) References Cited

U.S. PATENT DOCUMENTS

| | | | |
|---|---|---|---|
| 5,050,081 A | 9/1991 | Abbott et al. | |
| 5,499,025 A * | 3/1996 | Middleton | G05D 1/0083 340/959 |
| 6,262,674 B1 | 7/2001 | Wyatt | |
| 6,320,579 B1 * | 11/2001 | Snyder | G01C 23/005 345/419 |
| 6,650,974 B2 * | 11/2003 | Chamas | G01G 19/07 701/124 |
| 6,690,299 B1 * | 2/2004 | Suiter | G01C 23/005 340/973 |
| 6,718,236 B1 * | 4/2004 | Hammer | G08G 5/0008 342/36 |
| 6,933,859 B2 * | 8/2005 | Hurt | G01D 7/02 340/945 |
| 7,148,814 B2 | 12/2006 | Sikora et al. | |
| 7,161,501 B1 * | 1/2007 | Lynch | G08G 5/0065 340/945 |
| 7,634,353 B2 * | 12/2009 | Meunier | G05D 1/0083 701/120 |
| 7,636,617 B2 | 12/2009 | Artini et al. | |
| 7,735,005 B2 | 6/2010 | Holder et al. | |

(Continued)

*Primary Examiner* — Steven Lim
*Assistant Examiner* — Kam Wan Ma
(74) *Attorney, Agent, or Firm* — Ostrager Chong Flaherty & Broitman P.C.

(57) ABSTRACT

A flight deck display that represents the overall health of the airplane by combining energy state, system state and configuration state into one integrated representation that is triggered by the on-board engine indication and crew alerting system. The computer system for controlling the display unit is configured to display an airplane status indicator in the form of a symbolic representation of the airplane that persists across displays. The status indicator shows the energy state of the airplane and how energy is being added or subtracted from it in terms of altitude, airspeed, thrust, wind, etc. As the airplane gains energy, there is a projection of excess energy shown in front of the airplane. As the airplane loses energy, an alerting indicator will appear around the airplane symbol if the performance of the airplane becomes is too low.

14 Claims, 6 Drawing Sheets

(56) References Cited

U.S. PATENT DOCUMENTS

| | | | |
|---|---|---|---|
| 7,765,061 B1* | 7/2010 | Barber | G01C 23/00 701/436 |
| 7,783,393 B2* | 8/2010 | Tucker | G01C 23/00 340/945 |
| 8,131,410 B2 | 3/2012 | Nikolic et al. | |
| 8,527,871 B2 | 9/2013 | Holder et al. | |
| 8,660,718 B2 | 2/2014 | Holder | |
| 8,965,601 B1* | 2/2015 | Barber | G01C 23/005 340/974 |
| 2003/0132860 A1* | 7/2003 | Feyereisen | G01C 23/00 340/973 |
| 2004/0189492 A1* | 9/2004 | Selk, II | G01C 23/00 340/973 |
| 2008/0249674 A1* | 10/2008 | Constans | G01C 23/00 701/14 |
| 2009/0157287 A1* | 6/2009 | Shafaat | G01C 23/005 701/120 |
| 2011/0304479 A1* | 12/2011 | Chen | G08G 5/0021 340/951 |
| 2013/0060466 A1* | 3/2013 | Gurusamy | G01C 23/005 701/465 |
| 2013/0066487 A1* | 3/2013 | Holder | G08G 5/0021 701/14 |
| 2014/0039731 A1* | 2/2014 | Leberquer | B64C 19/00 701/3 |
| 2014/0156116 A1* | 6/2014 | Nelson | B64D 43/02 701/14 |
| 2014/0212847 A1 | 7/2014 | Holder et al. | |
| 2014/0371957 A1* | 12/2014 | Riedinger | B64D 43/02 701/3 |
| 2015/0054664 A1* | 2/2015 | Dupont De Dinechin | B64D 43/00 340/973 |

\* cited by examiner

AIRPLANE STATUS SYSTEM

BACKGROUND

This disclosure generally relates to electronic displays for airplane and more particularly relates to an integrated display for displaying information from a plurality of sources, as well as indicating the relationship between selected information.

Passenger and cargo airplane incorporate numerous sensors for obtaining information about the condition of various components and systems. The status indicators may be provided to various on-board data handling systems. Certain systems, such as the engine indications and crew alerting system ("EICAS") offer detailed information to the flight crew on the condition of various components in a jet engine. Other systems provide information about the status of the electrical system, hydraulic system, fuel system, landing gear system, flight control system, etc. There are hundreds of sensors that can potentially provide status indications to the flight crew.

As used herein, "status indication" refers to information providing status information or condition about an airplane component or system to the flight crew. Status indications are particularly important when an abnormal condition occurs, especially during flight. Thus, for the most part, the flight crew can focus on abnormal conditions as reflected by a status indication. A status indication informs the flight crew as to which airplane components or systems are not functioning properly. Depending on the nature of the status indication, the information can be very detailed, or very high level. The status indications can be presented to the flight crew in a variety of conventional ways, from a simple warning light to a text message on a computerized flight display. Evaluation of multiple simultaneous status indications can be difficult for the flight crew.

Organizing, processing, and presenting status information to the flight crew informs the crew of a potential issue or condition, but the flight crew must still adequately respond to the condition. The flight crew must be able to readily understand the meaning of the status condition, its implication for the operability of the airplane, and its relative impact to the operation of the current flight. During an abnormal condition, several status indicators may be reported, and it can be difficult for the flight crew to quickly assess the operational consequences of each status indicator. Once the impact is assessed, the flight crew must plan and perform any required work-around procedures associated with the status condition.

A typical flight deck has an alerting system that is not centralized. The alerting, checklists, system synoptic displays, and systems controls are distributed across the flight deck and require interpretation and repeated re-orienting of pilot attention. Controls for the system interface are placed on the overhead panel but the effects of a system failure are presented at a high-level individual system view in the system synoptic displays. Not all airplanes have electronic checklists or system synoptics and those that do are not integrated.

In particular, there is currently no integrated depiction of overall airplane health in the flight deck or the system to alert the flight crew to a trend toward a non-normal situation before an airplane system malfunction or an airplane flight path and current aerodynamic energy state the airplane is currently experiencing and/or will enter if corrections are not made. Some airplane incidents have been attributed to the lack of energy state awareness on the part of the flight crew or confusion on the part of the pilots, who may not understand the system failure or how the checklist will fix the failure.

It would be advantageous to provide a status indication display system that presents an integrated picture of the overall health and energy status of an airplane.

SUMMARY

The subject matter disclosed in detail below is directed to an airplane status representation and crew alerting system that produces a flight deck display representing overall airplane health by combining energy state information (e.g., thrust and wind), system state information (e.g., status of engines, hydraulics, and electrical systems) and configuration state information (e.g., flap settings and landing gear) into one integrated representation.

The airplane status representation and crew alerting system comprises a computer which is configured to control a display unit to display an airplane status indicator in the form of a symbolic representation of the airplane that persists across displays. In accordance with some embodiments, the airplane status indicator shows the energy state of the airplane and how energy is being added or subtracted from it in terms of altitude, airspeed, thrust, wind, etc. As the airplane gains energy, there is a projection of excess energy shown in front of the airplane. On the ground the energy display may indicate the projected take-off point on the runway based on the thrust setting and the runway conditions. As the airplane loses energy, an alerting indicator will appear around the airplane symbol if the performance of the airplane becomes too low. The airplane status indicator can be shown in a side view or a top-down view, but consistently represents energy state information across the different views.

When there is trending toward a failure, a representation of degraded health is displayed. If there is a failure, then the associated system diagram and integrated checklist are displayed to the flight crew. When a fault is detected, the system will display the associated system synoptic through a display-based control interface to the system components that is integrated with any associated required procedures or checklists.

More specifically, when there is an airplane system failure, the airplane and the surrounding circular band turn amber for caution conditions and red for warning conditions. When the pilot selects the alerting indicator (e.g., by touching a touch screen), the associated checklist and synoptic information are presented. When the pilot selects the indicator for an excessive energy state (high or low), the system will provide guidance on how to return the airplane to the nominal energy state.

The foregoing system creates an overall picture of airplane status for both airplane health and aerodynamic status. This system will enable the display-based control of system components and integrates them with procedures to provide a more robust interaction between the flight crew and the airplane.

One aspect of the subject matter disclosed in detail below is a computer-implemented method for displaying airplane status information, comprising: operating an airplane; displaying first symbology representing the airplane on a display screen; monitoring performance of the airplane during operation; and displaying second symbology when a value of a performance parameter of the airplane reaches a first preset threshold, wherein the second symbology surrounds at least a portion of the first symbology and has a first color. In accordance with some embodiments, the second symbology comprises a circular band having a center located within the first symbology.

In accordance with further steps of the method described in the preceding paragraph, the second symbology changes color from the first color to a second color different than the first color when a value of the performance parameter of the airplane reaches a second preset threshold beyond the first preset threshold, the second preset threshold being set at a level corresponding to a caution state; and changes color from the second color to a third color different than the first and second colors when a value of the performance parameter of the airplane reaches a third preset threshold beyond the second preset threshold, the third preset threshold being set at a level corresponding to a warning state.

The computer-implemented method described above may further comprise: acquiring current values of engine operating parameters during operation of one or more engines on the airplane; calculating a magnitude of thrust being produced by the engine(s) based on the current values of the engine operating parameters; displaying third symbology adjacent to the second symbology, wherein the third symbology indicates a direction and the calculated magnitude of the thrust; acquiring current values of wind speed and direction at a location of the airplane; calculating a wind force vector based on the current values of the wind speed and direction; and displaying fourth symbology adjacent to the second symbology, wherein the fourth symbology indicates the calculated wind speed and direction.

In addition or in the alternative, the above-described method may further comprise: monitoring the display screen to detect when a pressure is exerted on a portion of the display screen displaying a portion of the second symbology; and displaying a window comprising a checklist and a synoptics diagram in response to detection of pressure on the portion of the display screen displaying a portion of the second symbology.

Another aspect of the subject matter disclosed in detail below is a computer-implemented method for displaying airplane energy state information, comprising: acquiring current values of engine operating parameters during operation of one or more engines on the airplane; calculating a magnitude of thrust being produced by the engine(s) based on the current values of the engine operating parameters; acquiring current values of wind speed and direction at a location of the airplane; calculating a wind force vector based on the current values of the wind speed and direction; and displaying an airplane status indicator on a display screen, the airplane status indicator comprising first symbology representing the airplane, second symbology having a color indicative of a state of aircraft performance, third symbology representing the thrust vector, and fourth symbology representing the wind force vector.

A further aspect of the subject matter disclosed below is an onboard airplane system for displaying airplane status information, comprising: a flight management system comprising at least one flight management computer configured to compute values for performance parameters of the airplane; a display unit situated on a flight deck of the airplane, the display unit comprising a display screen; and a computer system in communication with the flight management system and the display unit, and configured to be capable of performing the following operations: causing the display unit to display first symbology representing the airplane on the display screen; monitoring the performance parameter values during operation of the airplane; and causing the display unit to display second symbology when a performance parameter value of the airplane reaches a first preset threshold, wherein the second symbology surrounds at least a portion of the first symbology and has a first color. The computer system may be further configured to cause the display unit to change the second symbology from the first color to a second color different than the first color when a value of the performance parameter of the airplane reaches a second preset threshold beyond the first preset threshold, the second preset threshold being set at a level corresponding to a caution state; and cause the display unit to change the second symbology from the second color to a third color different than the first and second colors when a value of the performance parameter of the airplane reaches a third preset threshold beyond the second preset threshold, the third preset threshold being set at a level corresponding to a warning state.

In accordance with some embodiments of the system described in the preceding paragraph, the computer system is further configured to be capable of performing the following operations: acquiring values of engine operating parameters during operation of one or more engines on the airplane; calculating a magnitude of thrust being produced by the engine(s) based on the acquired values of the engine operating parameters; acquiring values of wind speed and direction at a location of the airplane; calculating a wind force vector based on the acquired values of the wind speed and direction; and causing the display unit to display third symbology representing the thrust vector and fourth symbology representing the wind force vector on the display screen.

Yet another aspect of the disclosed subject matter is a computer-implemented method for displaying airplane energy state information, comprising: operating an airplane during a takeoff or landing phase; displaying runway symbology representing a runway and airplane symbology representing an airplane on a display screen, wherein a portion of the airplane symbology is superimposed on a first portion of the runway symbology; acquiring speed and acceleration values respectively representing a speed and an acceleration of the airplane at a present time; and displaying at the present time an arc representing a predicted position of the airplane at a future time if the speed and acceleration of the airplane remain constant during a time interval from the present time to the future time, wherein a portion of the arc is superimposed on a second portion of the runway symbology.

Other aspects of airplane status representation and crew alerting systems are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of an airplane status representation and crew alerting system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
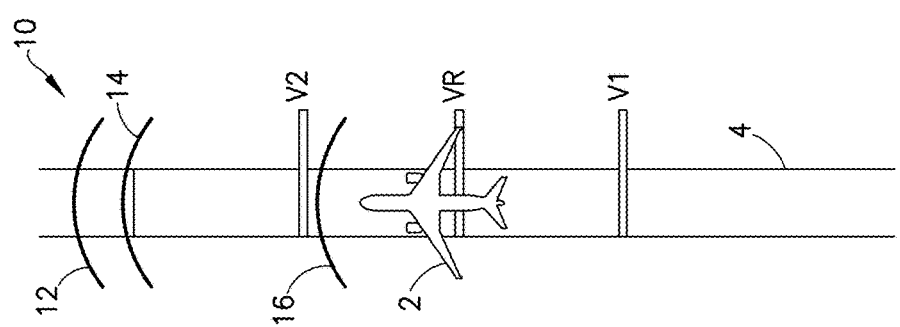
FIG. 1 is a diagram representing a portion of a screenshot displayed by a display unit, the content of which includes symbology representing the take-off performance status of an airplane.

FIG. 1 is a diagram representing a portion 10 of a screenshot displayed by a display unit, the content of which includes symbology representing a take-off performance status of an airplane. The display includes the following symbology: an airplane icon 2 representing the airplane on which the system disclosed herein is installed; a runway symbol 4 in the form of a stripe representing the runway on which the airplane is taking off; an arc 12 representing the computed last physical location where the airplane can safely stop on the runway; an arc 14 representing a location before the computed last physical location where the airplane can safely stop on the runway; and an arc 16 indicating where the airplane will be physically at a future time (e.g., 10 seconds) if the current performance is maintained. Arc 16 is a dynamic arc that will move forward or back with changes in speed. Arcs 12 and 14 will be located at fixed positions relative to the runway. If the nose of the airplane reaches the position indicated by arc 14, then the pilot should try to stop the airplane to avoid a runway excursion. If the nose of the airplane reaches the position indicated by arc 12, then the pilot should take appropriate action in anticipation of a runway excursion. The bars respectively labeled V1, VR, and V2 indicate where the airplane will be when it reaches the respective V-speeds which are computed by and pulled from an onboard computer such as a flight management computer of the flight management system. It should be understood that the elements displayed in FIG. 1 would be typically displayed in color. For example, arc 12 may be red, arc 14 may be amber or orange, and arc 16 may be green.

A flight deck display unit can be controlled by a computer to display an intuitive depiction of airplane energy state information such as that shown in FIG. 1 that is useful to pilots. Here, it may be helpful to briefly discuss the generally accepted definition of airplane energy state and how it relates to the intuitive depiction of airplane energy state information of this disclosure.

In the large, from the perspective of airplane maneuverability, three sources of energy are available to generate aerodynamic forces to maneuver the airplane: kinetic energy, which increases with increasing speed; potential energy, which is proportional with altitude; and chemical energy, which is fuel from the airplane's fuel tanks. From a broader physics or engineering perspective, the term "airplane energy state" or "energy state" generally describes how much of each kind of energy the airplane has at a given time.

From the perspective of a pilot who is tasked with flying an airplane, however, the term "energy state" is more useful for assessing, understanding, or being aware of the maneuverability of the airplane. In addition to this awareness of the maneuverability of the airplane, in this disclosure, "energy state" can also be useful to refer to or describe the state of the airplane with respect to how "close" or how "far" the airplane is from the edges of the flight envelope or from a normal, abnormal, or an upset condition such as excessive pitch attitude, excessive bank angle, stall and placard limits, or stalls characterized by one or more of conditions such as buffeting, lack of pitch authority, lack of roll control, inability to arrest descent rate and the like.

In addition, contributing factors to the energy state of the airplane and the pilot's ability to maneuver the airplane can be, without limitation, wind speed, wind direction, current thrust, available thrust, as well as other factors related to the aircraft's configuration such as flap settings, landing gear status, or other airplane systems and components whose configuration or status can directly or indirectly affect a pilot's ability to control the generation of aerodynamic forces and moments to maneuver the airplane.

In accordance with one embodiment, this computer-implemented method comprises the following operations: operating the airplane during a takeoff phase; displaying a runway symbol 4 representing a runway and an airplane icon 2 representing an airplane on a display screen, wherein a portion of the airplane icon 2 is superimposed on a first portion of the runway symbol 4; acquiring speed and acceleration values respectively representing a speed and an acceleration of the airplane at a present time; and displaying at the present time an arc 16 representing a predicted position of the airplane at a future time if the speed and acceleration of the airplane remain constant during a time interval from the present time to the future time, wherein a portion of the arc 16 is superimposed on a second portion of the runway symbol 4.

Figure 2:
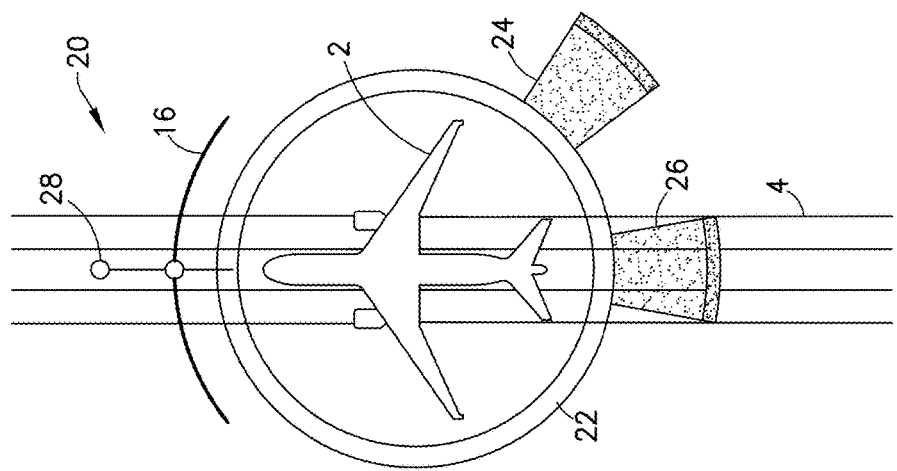
FIG. 2 is a diagram representing a portion of a screenshot displayed by a display unit, the content of which includes symbology representing the landing performance status of an airplane.

FIG. 2 is a diagram representing a portion 20 of a screenshot displayed by a display unit, the content of which includes symbology representing a landing performance status of an airplane. Again, although not evident from this black and white drawing, the display would normally be in color. In the exemplary situation depicted in FIG. 2, the status of the airplane is that an alert has been issued, as indicated by the appearance of an alerting indicator 22 in the shape of a circular band surrounding the airplane icon 2. In accordance with some embodiments, a relative severity level of the alerting indicator 22 may be indicated by using different colors or by blinking the indicator. Thus, the color amber may be used for a relatively lower severity level alert, and red can be used for a relatively higher severity level alert. Other embodiments for indicating a relative severity level are possible.

The alerting indicator 22 around the airplane icon 2 indicates a problem with the airplane performance status, and will appear in a first color (e.g., gray) as the airplane performance reaches a specified threshold (i.e., limit) as set in the flight management computer, and then change from the first color to a second color (e.g., amber or orange) and then to a third color (e.g., red) if the airplane performance is exceeding other specified parameters. In the example depicted in FIG. 2, the alerting indicator 22 takes the form of a circular band that surrounds the airplane icon. In alternative implementations, the circular band may have inner and outer circumferences that intersect the airplane rather than surround the airplane. In yet other implementations, the alerting indicator may have non-circular geometric shapes, such as an n-sided regular (i.e., convex or star) polygon, where n≥3.

The display seen in FIG. 2 further includes the following symbology: a runway symbol 4 representing the runway on which the airplane is landing; an arc 16 indicating where the airplane will be physically at a future time (e.g., 10 seconds) if the current performance is maintained (the arc 16 in FIG. 2 is the same representation as shown in FIG. 1); a wind indicator 24 extending radially outward from the alerting indicator 22 at an angle indicative of the wind direction; a thrust indicator 26 extending radially outward from the alerting indicator 22; and a target indicator 28 representing a target position of the nose of the airplane at which some event should occur in the future (e.g., touch down). For example, while the airplane is on the ground, the target indicator 28 may indicate the projected take-off point on the runway based on the thrust setting and runway conditions.

It is important to note here that the symbology and convention used here is what is believed to be useful to the pilot, but other types of symbology and conventions can be employed. For example, the thrust indicator in FIG. 2 is extending radially outward in the rear direction but another alternate symbology and convention can be equally used to show the thrust indicator to extend radially outward in the forward direction. Similarly, while wind direction can be reported by the direction from which it originates, the depiction here is to have a wind indicator showing wind direction relative to the airplane, which is a more useful and intuitive indicator to pilots.

In FIG. 2, the wind indicator 24 and thrust indicator 26 are each in the form of an annular ring segment having concentric inner and outer radii, the center being collocated with the center of the alerting indicator 22. Alternatively, these indicators could be in the form of trapezoidal segments having inner and outer sides which are mutually parallel. In accordance with further alternatives, these indicators may have rectangular shapes.

In the representation of FIG. 2, the wind direction and velocity are graphically presented relative to the airplane. The wind indicator 24 may be located such that a radial line (not shown) from the center of the alerting indicator 22 to a midpoint of the outer radius of the wind indicator 24 indicates the wind direction relative to the orientation of the airplane. The wind velocity may be indicated by annular bands having different colors or different shades of the same color (e.g., blue), with each velocity increment (e.g., 5 or 10 knots) being represented by a respective band of color. In FIG. 2, only one such annular band is shown. Alternatively, the wind direction and velocity could be represented numerically in an area adjacent to the wind indicator 24.

Similarly, the thrust direction and magnitude are graphically presented relative to the airplane. The thrust indicator 26 may be located such that a radial line (not shown) from the center of the alerting indicator 22 to a midpoint of the outer radius of the thrust indicator 26 indicates the direction of the thrust relative to the orientation of the airplane, which thrust is typically aligned with the centerline of the airplane. The magnitude of the thirst may be indicated by annular bands having different colors or different shades of the same color (e.g., blue), with each thrust increment being represented by a respective band of color. In FIG. 2, only one such annular band is shown. Alternatively, the magnitude of the thrust could be represented numerically in an area adjacent to the thrust indicator 26.

The thrust indicator 26 represents thrust is being applied to the airplane to maintain speed. It will fluctuate with the application of thrust by the thrust management system. The inputs for this are derived from the crew data system. The crew data system is the software system that sends sensed data to the displays and includes the EICAS but not the flight management system.

A flight deck display unit can be controlled by a computer to display the airplane energy state information depicted in FIG. 2. In accordance with one embodiment, this computer-implemented method comprises the following operations: operating an airplane; displaying an airplane icon 2 representing the airplane on a display screen; monitoring performance of the airplane during operation; and displaying an alerting indicator 22 when a value of a performance parameter of the airplane reaches a first preset threshold, wherein the alerting indicator 22 surrounds at least a portion of the airplane icon 2 and has a first color. In accordance with further steps of this method, the alerting indicator 22 changes color from the first color to a second color different than the first color when a value of the performance parameter of the airplane reaches a second preset threshold beyond the first preset threshold, the second preset threshold being set at a level corresponding to a caution state; and changes color from the second color to a third color different than the first and second colors when a value of the performance parameter of the airplane reaches a third preset threshold beyond the second preset threshold, the third preset threshold being set at a level corresponding to a warning state.

The computer-implemented method described in the preceding paragraph may further comprise: acquiring current values of engine operating parameters during operation of one or more engines on the airplane; calculating a magnitude of thrust being produced by the engine(s) based on the current values of the engine operating parameters; displaying a thrust indicator 26 adjacent to the alerting indicator 22, wherein the thrust indicator 26 indicates a direction and the calculated magnitude of the thrust; acquiring current values of wind speed and direction at a location of the airplane; calculating a wind force vector based on the current values of the wind speed and direction; and displaying a wind indicator 24 adjacent to the alerting indicator 22, wherein the wind indicator indicates the calculated wind speed and direction.

Figure 3:
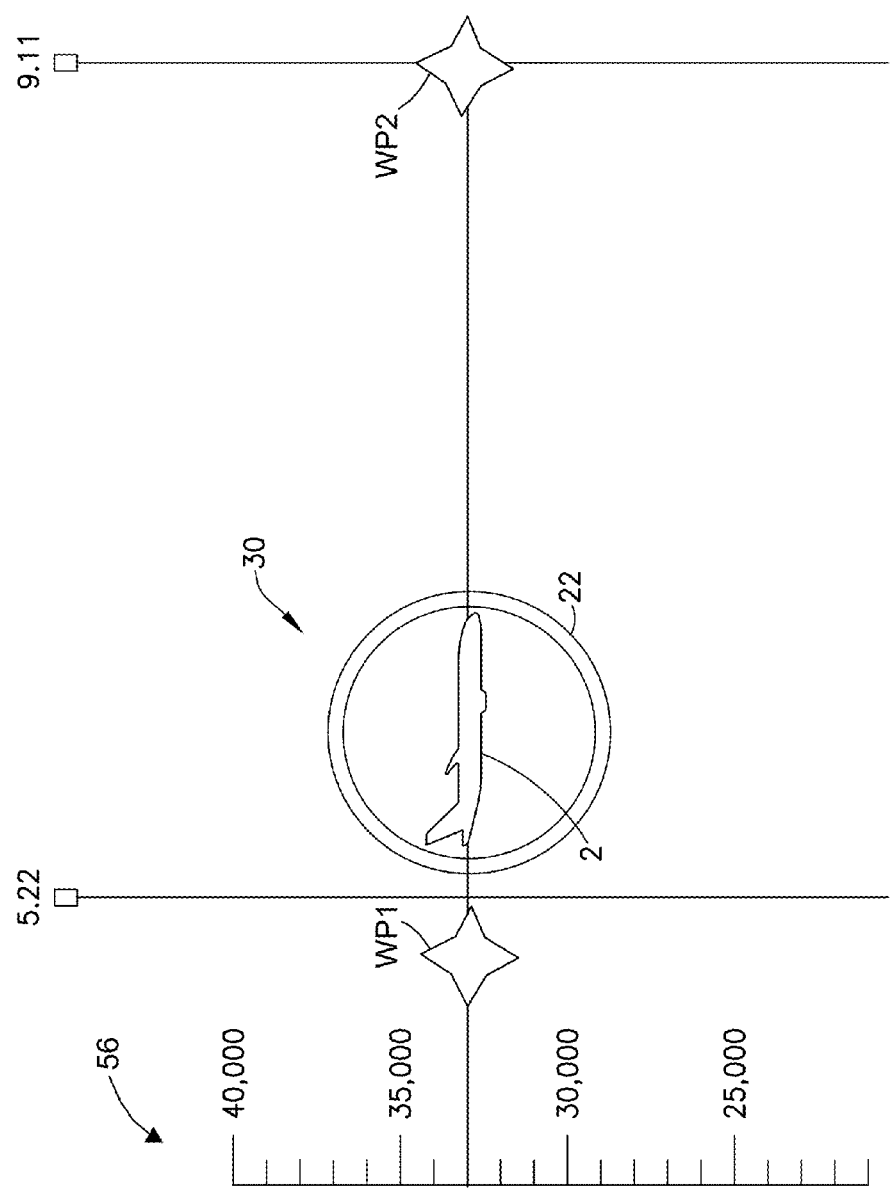
FIG. 3 is a diagram representing a portion of a screenshot displayed by a display unit, the content of which includes symbology representing the in-flight performance status of an airplane.

FIG. 3 is a diagram representing a portion 30 of a screenshot displayed by a display unit, the content of which includes an altitude scale 56, a pair of star symbols representing waypoints WP1 and WP2, and symbology representing the in-flight performance status of an airplane. Again, although not evident from this black and white drawing, the display would normally be in color. In the exemplary situation depicted in FIG. 3, the status of the airplane is that an alert has been issued, as indicated by the appearance of an alerting indicator 22 in the shape of a circular band surrounding the airplane icon 2. The airplane symbol 2 shown in FIG. 3 is a side view of the airplane. If the airplane begins to approach stall or some other undesired state, the alerting indicator 22 will appear around the airplane symbol 2 in a first color (e.g., gray) as the airplane performance reaches a specified threshold (i.e., limit) as set in the flight management computer, and then change from the first color to a second color and then to a third (e.g., from gray to amber to red) if the airplane performance exceeds other specified performance parameters.

Figure 4:
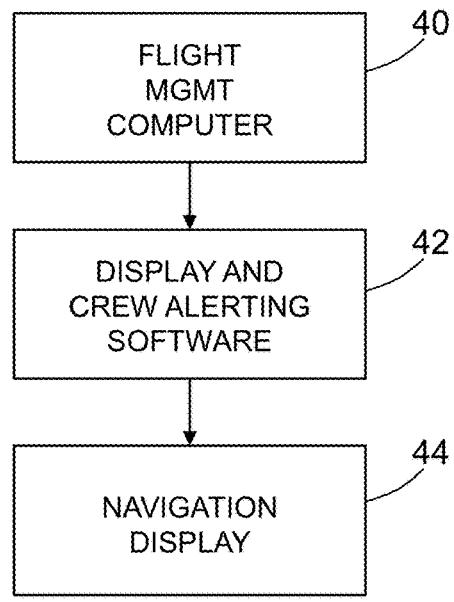
FIG. 4 is a block diagram identifying components of an airplane system that enables the display of status representation and crew alert symbology in accordance with one embodiment.

FIG. 4 is a block diagram identifying components of an airplane system that enables the display of status representation and crew alert symbology in accordance with one embodiment. The system comprises a flight management computer 40, a display and crew alerting software module 42 running on an onboard computer such as EICAS, and a navigation display unit 44 (which may be a multi-functional display unit having a navigation display mode). The display and crew alerting software module is the avionics source of the inputs for displaying the symbology described above and is part of the Engine Indications and Crew Alerting System (EICAS). The flight management computer 40 is the source of computed values for various performance parameters, which parameter values may result in the issuance of an alert when an airplane performance parameter exceeds a limit specific to that parameter. Such exceedances are detected by the display and crew alerting software module. The alerting indicator displayed on the navigation display 44 can be the alerting indicator 22 shown in FIGS. 2 and 3 or an alerting indicator having a different geometry. The concept disclosed herein does not require any specific geometry of the alerting indicator, so long as the alerting indicator is proximate to and visually distinguishable from the airplane icon 2.

Figure 5:
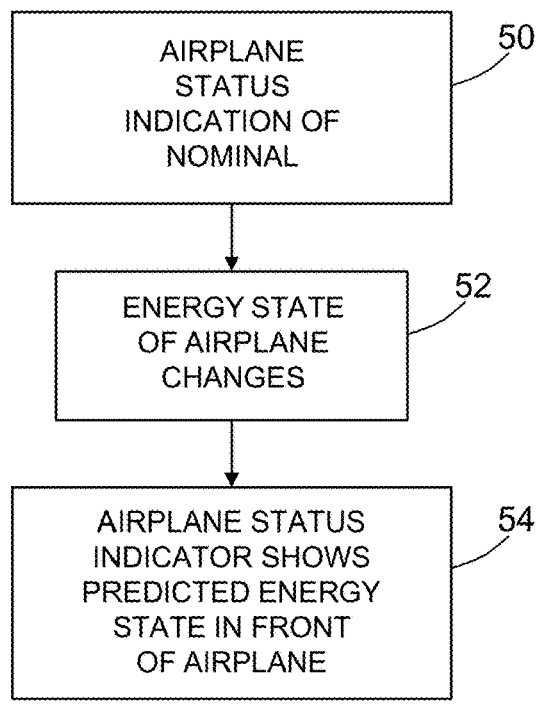
FIG. 5 is a flowchart identifying steps of a method for displaying energy status information of an airplane on a navigation display.

FIG. 5 is a flowchart identifying states for displaying energy status information of an airplane on a navigation display. When the airplane is stationary on a runway (state 50), the displayed symbology will indicate that the airplane currently has a nominal status (operation 50). When the airplane is moving (state 52), i.e., when the energy state of the airplane is changing (e.g., by operating the engines to produce thrust or changing wind conditions), thrust and/or wind indicators may be displayed in a manner similar to or the same as shown in FIG. 2. If a non-normal (i.e., abnormal) condition has not been detected, then the thrust and wind indicators will be displayed while the alerting indicator will not.

The airplane status indicator described above includes a representation of the airplane that persists across displays. In accordance with some embodiments, the airplane status indicator also shows information about the energy state of the airplane and how energy is being added or subtracted from it in terms of altitude, airspeed, thrust, wind, etc. As the airplane gains energy, there is a projection of excess energy shown in front of the airplane (step 54 in FIG. 5). The airplane status indicator can be shown in a side view or a top-down view, but consistently represents energy state information across the different views.

Figure 6:
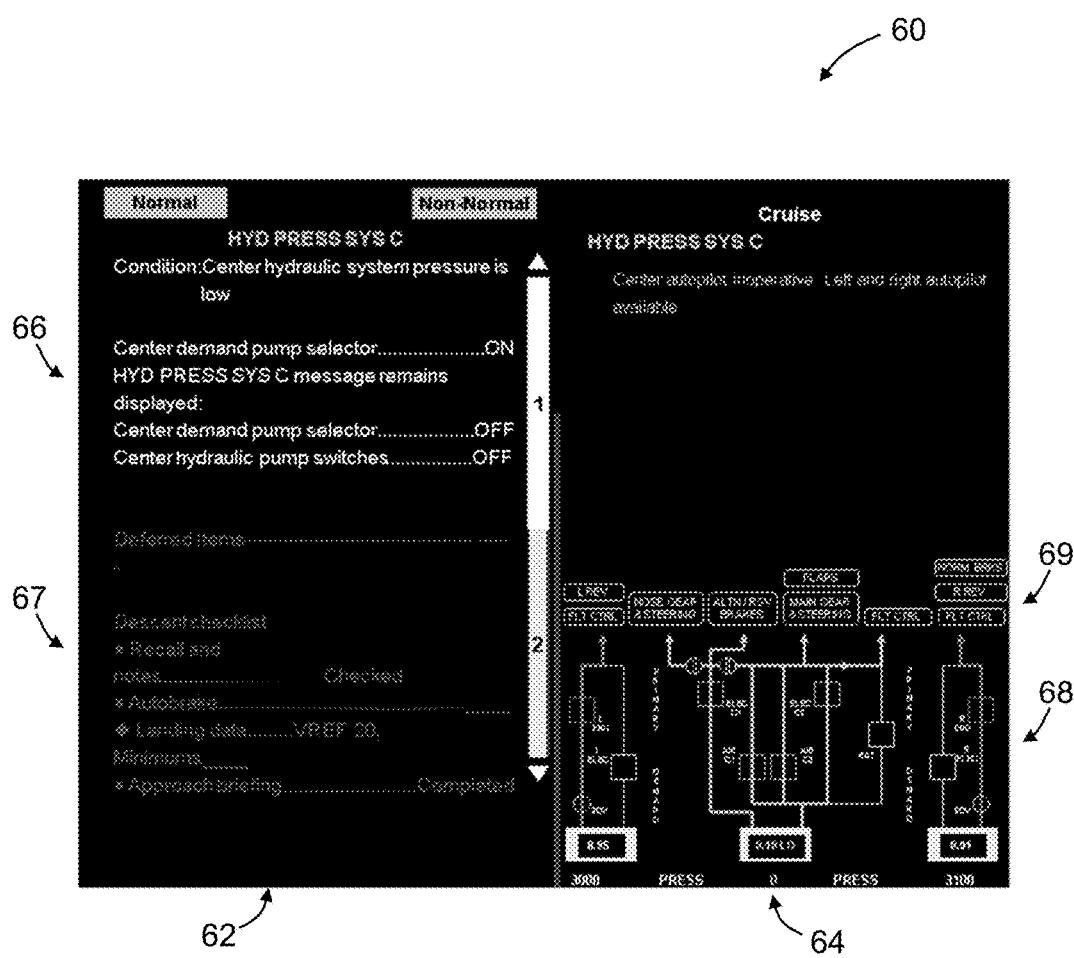
FIG. 6 is a diagram representing a portion of a screenshot displayed by a display unit, the content of which includes symbology representing one example of an integrated checklist/synoptic display.

When there is an airplane system failure (e.g., engine, hydraulics or electrical system), the airplane icon 2 and the surrounding alerting indicator 22 change from a first color to a second color to indicate caution conditions and change from a second color to a third color to indicate warning conditions. When the pilot selects the alerting indicator 22 (e.g., by touching the region of a touch screen display where the alerting indicator is located), associated checklist and synoptic information will be presented as depicted in FIG. 6. When the pilot selects the alerting indicator 22 for an unexpected or abnormal energy state (high or low), the system will provide guidance on how to return the airplane to the nominal energy state.

More specifically, the system can present an integrated checklist/synoptic display of the type disclosed in U.S. Pat. No. 8,660,718, the disclosure of which is incorporated by reference herein in its entirety. Thus the alerting indicator 22 can provide an entry point into an operational consequences system of the type disclosed in that patent.

FIG. 6 represents a portion 60 of a screenshot displayed by a display unit, the content of which includes symbology representing one example of an integrated checklist/synoptic display. This integrated checklist/synoptic display can be presented on the navigation display which displayed screenshots 10, 20 and 30 or on a different display unit situated near the navigation display.

The screenshot 60 shown in FIG. 6 has a left panel 62 and a right panel 64. In the example depicted in FIG. 6, a checklist 66 is displayed in the left panel 62 and a synoptic display 68 is displayed in the right panel 64. Each alert condition may have an associated checklist. The checklist 66 broadly defines a list of information, actions, or commands for the flight crew to review in response to the detected alert condition. The checklist 66 may be descriptive information about related systems impacted by the alert condition, or factors to keep in mind during operation. The checklist 66 may include prescriptive actions to be considered or performed by the flight crew. However, the exact classification, if any, of the type of checklist information displayed can vary, and does not need to follow the above illustration or categories.

The checklist 66 shown in the left panel 62 of screenshot 60 comprises a bulleted list of items pertinent to a condition described in FIG. 6 as "Center hydraulic system pressure is low". In various embodiments, the checklist may take various forms. In this embodiment, the checklist can comprise a list of prescriptive commands to be performed by the flight crew to address this condition. In other embodiments, the checklist can comprise actions that are not to be taken. The left panel 62 also includes a "Deferred Items" list 67.

The right panel 64 of screenshot 60 presents a synoptic diagram 68, which can either be automatically presented with the checklist panel, or the user can request it by providing touch screen input to view it. Synoptic diagrams include functional and/or system diagrams reflecting the layout, operation and/or status of components. Typically, the synoptic diagram 68 represents a portion of the design for the particular type of airplane being flown. In this embodiment, the synoptic diagram 68 includes the system or component associated with detected alert condition. In this diagram, left and right hydraulic systems are shown with the center hydraulic system. Thus the synoptic diagram 68 can include related systems in addition to the impacted system. The diagrams can show each system's configuration along with an operational readiness indicator. For example, the center hydraulic system has an operational status of only 0.1 (or 10%) of normal, whereas the left and right hydraulic systems are at 0.95 (or 95%) and 0.91 (or 91%) of normal respectively. Thus, the synoptic diagrams may incorporate real-time measurements, performance, or other values associated with the operation of the system displayed.

The synoptic diagram 68 may also incorporate various function keys 69 that allow the user to request more specific information, update values, or change the display to view another related system diagram. In typical embodiments the display screen is able to present further details to the user, including labels of the various components indicated, status information, measurement indications, etc. In particular, the pilot may select a different synoptic diagram by touching one of function keys 69.

The system proposed herein presents an integrated picture of the overall health, including energy status, system state and configuration state, of the airplane. It integrates checklists with systems controls and system synoptic functions, such that "checking" an item accomplishes the desired effect on the system (e.g., the checklist is now linked to the systems controls that were once connected to the overhead panel). The checklist is the control; it is the "check-and-do" list. Feedback of checklist actions is presented on a "data-driven" synoptic display which presents a graphic of affected systems and controls for the existing non-normal condition. Federated systems synoptic pages (e.g. FUEL, FLT CTRLS) are still selectable, but are no longer the normal method of viewing this information. Rather, the synoptic is a context-based display of relevant information, driven by phase of flight (e.g. "gate view", "cruise view") or non-normal condition.

The procedural flows pilots use to configure airplane systems for different parts of the flight are stored as preset configurations that can be selected, modified, or automated. Any items that are dependent on situational variability can be presented to the flight crew as a subset of controls in an otherwise relatively stable configuration.

The checklist interface is presented as an interactive display. Procedures and associated controls are shown together and can be selected in the required order. Checklist steps and system effects are shown on the data-driven synoptic on a central forward display.

The large synoptic display depicted in FIG. 6 provides an at-a-glance graphical overview of the number and nature of required actions, and the nature of the required tasks. (e.g., which systems or flight controls are affected). Synoptic elements are highlighted in parallel with checklist items.

As disclosed in U.S. Pat. No. 8,660,718, the consequences of a system failure can be further integrated into the flight plan so that when the airplane is constrained by a system malfunction, those constraints are represented across the relevant display suite such as being integrated into the flight plan representation.

Figure 7:
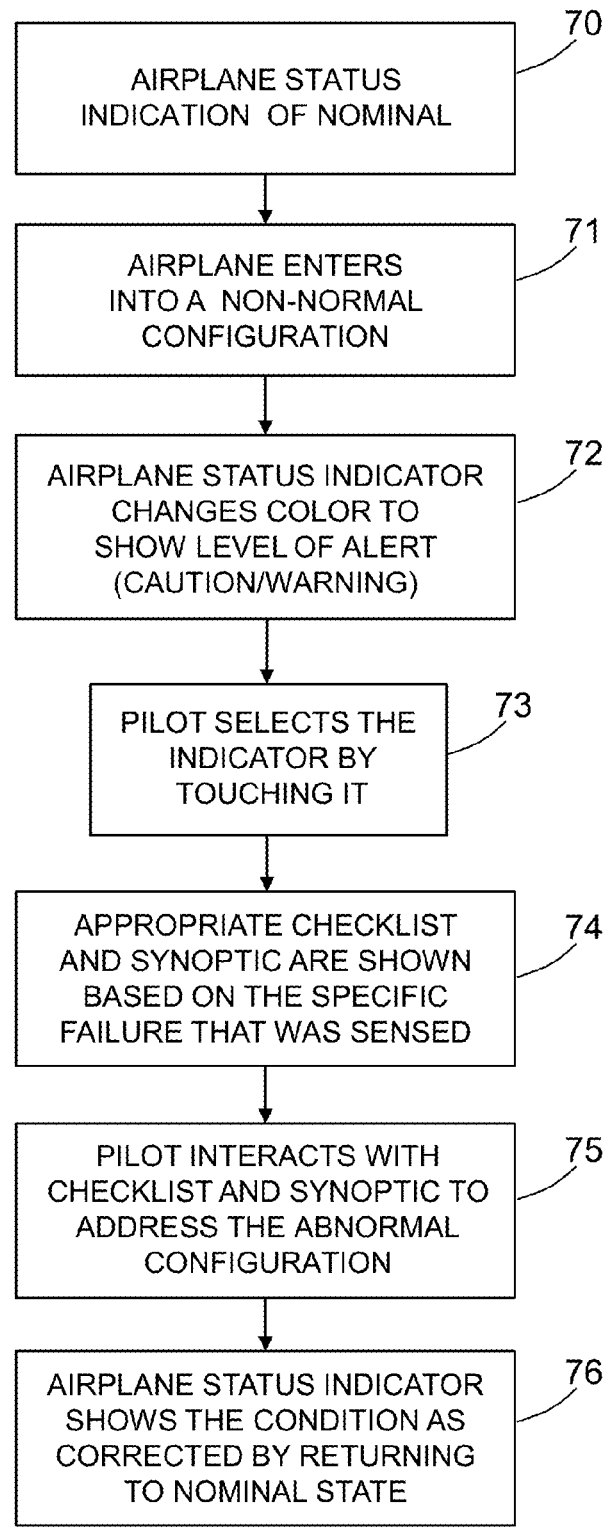
FIG. 7 is a flowchart identifying steps of a method for displaying airplane status indicators, checklists and system synoptics to the flight crew.

FIG. 7 is a flowchart identifying steps of a method for displaying airplane status indicators, checklists and system synoptics to the flight crew in accordance with one embodiment. When the energy state of the airplane is in a nominal condition such as steady-state cruise, an airplane status indication is displayed indicating that the airplane is in a nominal state (step 70). In the event that the airplane enters into an abnormal configuration (step 71) for a particular flight phase, an airplane status indicator is displayed which changes color to show the level of alert, e.g., from orange for a caution to red for a warning (step 72). If the pilot chooses to try to resolve the problem, the pilot can select the displayed airplane status indicator by touching it with the tip of a finger (step 73). In response to this selection, the appropriate checklist and synoptic diagram are displayed based on the specific failure that was sensed (step 74). The pilot can then interact with the checklist and the synoptic diagram (e.g., in the manner previously described with reference to FIG. 6) to address the abnormal configuration (step 75), for example, by reconfiguring the airplane and then inputting that reconfiguration in place of the existing abnormal configuration. In response to such reconfiguration of the affected airplane system, the airplane status indicator shows that the abnormal condition has been corrected by returning to the nominal state (step 76).

The processes disclosed herein can be implemented using a variety of processing devices. As disclosed herein, the airplane status system disclosed herein can be integrated into the electronic flight bag system of a commercial airplane. In other embodiments, the airplane status system can be integrated with other airplane systems, such as the flight control information, navigation, or other forward display systems. In other embodiments, the airplane status system may be a stand-alone system.

Figure 8:
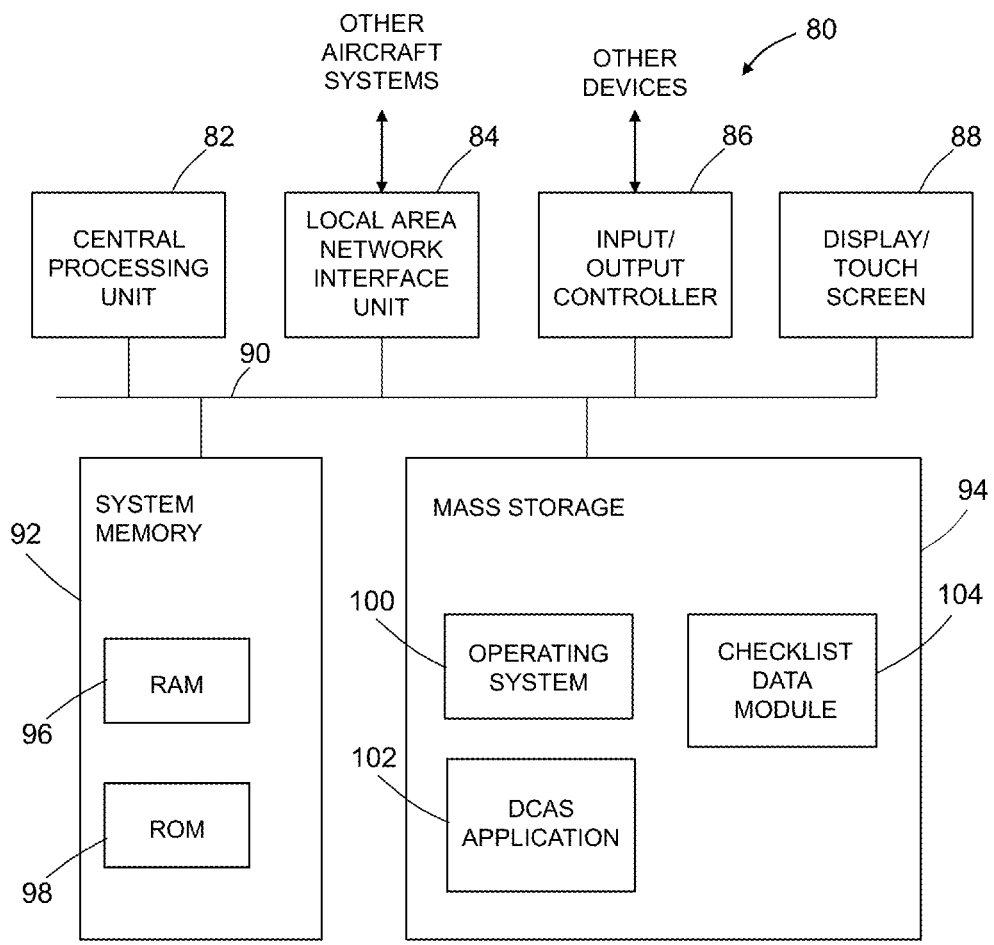
FIG. 8 is a block diagram representing the architecture of a airplane status representation and crew alerting system in accordance with one embodiment.

One embodiment for a computing architecture for a device capable of executing the operations and software components described herein is shown in FIG. 8. The computer architecture shown in FIG. 8 illustrates a conventional desktop, laptop, or server computer and may be utilized to execute any aspect of the methods presented herein. The computer 80 may be a part of an existing flight information processing system or a dedicated system for providing airplane status information.

The computer architecture shown in FIG. 6 may include a central processing unit 82 (CPU), a system memory 92 including a random access memory 96 (RAM) and a read-only memory (ROM) 98, and a system bus 90 that couples the memory to the CPU 82. A basic input/output system containing the basic routines for transferring information between elements within the computer 80, such as during startup, is stored in the ROM 98. The computer 80 further includes a mass storage device 94 for storing an operating system 100, and the DCAS application programs 102, and other related data, such as a checklist data module 104 as described herein.

The mass storage device 94 is connected to the CPU 82 through a mass storage controller (not shown) connected to the bus 90. The mass storage device 94 and its associated computer-readable media provide non-volatile storage for the central processing unit 82. Although the description of computer-readable media contained herein refers to a mass storage device, such as a hard disk or CD-ROM drive, it should be appreciated by those skilled in the art that computer-readable media can be any available computer storage media that can be utilized by the computer 80.

According to various embodiments, the computer 80 may operate in a networked environment using logical connections to other airplane system computers in the airplane through a local area network interface unit 84. The CPU 82 may connect via bus 90 and local area network interface unit 84 to other systems, such as to receive airplane status information, including airplane energy state information. It should be appreciated that the local area network interface unit 84 may also be utilized to connect to other types of networks and remote computer systems.

The computer 80 may also include an input/output controller 86 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

Finally, the computer 80 also comprises in one embodiment a display/touch screen 88. This is used to present information to the user, as well as to receive touch input signals associated with a function key or other input presented to the user as part of the graphical user interface.

A number of program modules and data files may be stored in the mass storage device 94 and RAM 96 of the computer 80, including an operating system 100 suitable for controlling the operation of computer 80. The mass storage device 94 and RAM 96 may also store one or more program modules. In particular, the mass storage device 94 may store the DCAS application 102 that is operative to perform the operations described above. The mass storage device 94 and the RAM 96 may also store other types of program modules. For example, the program modules may involve recalculation of certain parameters or values depending on the context of the reported status condition. The request for recalculation of these parameters may be linked by icons such that selection of the icon initiates recalculation of the appropriate parameters.

The mass storage device 94 may also store the checklist data module 104 comprising associated checklists. Other information may be stored, including the synoptic diagrams and airplane energy state information.

Many embodiments of the invention described below may take the form of computer-executable instructions, such as routines executed by a programmable computer. The airplane status system can be embodied in a special-purpose computer or data processor that is specifically programmed, configured or constructed to perform one or more of the computer-executable instructions described below. Accordingly, the term "computer" as generally used herein includes any processor and can include Internet appliances, handheld devices (including palm-top computers, wearable computers, cellular or mobile phones, multiprocessor systems, processor-based or programmable consumer electronics, mini-computers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the system described above may be stored or distributed on computer-readable media, including magnetic or optically readable computer disks (e.g., removable disks), as well as distributed electronically over networks. The airplane status information can be presented on displays or display media, for example, CRT screens, LCD screens or other suitable devices.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit).

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A computer-implemented method for displaying airplane energy state information, comprising:
    acquiring current values of engine operating parameters during operation of one or more engines on the airplane;
    calculating a magnitude of thrust being produced by the engine(s) based on the current values of the engine operating parameters;
    acquiring current values of wind speed and direction at a location of the airplane;
    calculating a wind force vector relative to the airplane based on the current values of the wind speed and direction; and
    displaying an airplane status indicator on a display screen, said airplane status indicator comprising first symbology representing the airplane, second symbology having a color indicative of a state of aircraft performance, third symbology representing the thrust vector, and fourth symbology representing the wind force vector relative to the airplane,
    wherein the third symbology is located adjacent to the second symbology such that a radial line from a center of the second symbology to a midpoint of the third symbology indicates the thrust direction relative to the orientation of the airplane, and the magnitude of the thrust is indicated by different colors or different shades of the same color, with each thrust increment being represented by a respective band of color; and
    wherein the fourth symbology is located adjacent to the second symbology such that a radial line from a center of the second symbology to a midpoint of the fourth symbology indicates the wind direction relative to the orientation of the airplane, and the wind velocity is indicated by different colors or different shades of the same color, with each velocity increment being represented by a respective band of color.

2. The computer-implemented method as recited in claim 1, wherein the second symbology is displayed when an amount of energy of the airplane reaches a first preset threshold, and wherein said second symbology surrounds at least a portion of said first symbology and has a first color.

3. The computer-implemented method as recited in claim 2, wherein said second symbology comprises a circular band having a center located within said first symbology.

4. The computer-implemented method as recited in claim 2, wherein said second symbology changes color from said first color to a second color different than said first color when the amount of energy of the airplane reaches a second preset threshold beyond said first preset threshold, said second preset threshold being set at a level corresponding to a caution state.

5. The computer-implemented method as recited in claim 4, wherein said second symbology changes color from said second color to a third color different than said first and second colors when the amount of energy of the airplane reaches a third preset threshold beyond said second preset threshold, said third preset threshold being set at a level corresponding to a warning state.

6. The computer-implemented method as recited in claim 5, wherein said second color is amber or orange and said third color is red.

7. The computer-implemented method as recited in claim 1, further comprising:
- monitoring the display screen to detect when a pressure is exerted on a portion of the display screen displaying a portion of said second symbology; and
- displaying a window comprising a checklist and a synoptics diagram in response to detection of pressure on the portion of the display screen displaying a portion of said second symbology.

8. The computer-implemented method as recited in claim 1, wherein said second symbology comprises a circular band, said third symbology comprises a first segment extending outward from an outer circumference of said circular band, and said fourth symbology comprises a second segment extending outward from the outer circumference of said circular band.

9. An onboard airplane system for displaying airplane status information, comprising:
- a flight management system comprising at least one flight management computer configured to compute values for performance parameters of the airplane;
- a display unit situated on a flight deck of the airplane, said display unit comprising a display screen; and
- a computer system in communication with said flight management system and said display unit, and configured to be capable of performing the following operations:
- causing said display unit to display first symbology representing the airplane on said display screen;
- monitoring an energy state of the airplane during operation of the airplane, wherein contributing factors to the energy state of the airplane which are taken into account include at least wind speed, wind direction, current thrust, available thrust, flap settings, and landing gear status;
- causing said display unit to display second symbology on said display screen when the energy state of the airplane reaches a first preset threshold, wherein said second symbology surrounds at least a portion of said first symbology and has a first color;
- acquiring values of engine operating parameters during operation of one or more engines on the airplane;
- calculating a magnitude of thrust being produced by the engine(s) based on the acquired values of the engine operating parameters;
- acquiring values of wind speed and direction at a location of the airplane;
- calculating a wind force vector relative to the airplane based on the acquired values of the wind speed and direction; and
- causing said display unit to display third symbology representing the thrust vector and fourth symbology representing the wind force vector on said display screen relative to the airplane,
- wherein the third symbology is located adjacent to the second symbology such that a radial line from a center of the second symbology to a midpoint of the third symbology indicates the thrust direction relative to the orientation of the airplane, and the magnitude of the thrust is indicated by different colors or different shades of the same color, with each thrust increment being represented by a respective band of color; and
- wherein the fourth symbology is located adjacent to the second symbology such that a radial line from a center of the second symbology to a midpoint of the fourth symbology indicates the wind direction relative to the orientation of the airplane, and the wind velocity is indicated by different colors or different shades of the same color, with each velocity increment being represented by a respective band of color.

10. The system as recited in claim 9, wherein said computer system is further configured to cause said display unit to change said second symbology from said first color to a second color different than said first color when the energy state of the airplane reaches a second preset threshold beyond said first preset threshold, said second preset threshold being set at a level corresponding to a caution state.

11. The system recited in claim 10, wherein said computer system is further configured to cause said display unit to change said second symbology from said second color to a third color different than said first and second colors when the energy state of the airplane reaches a third preset threshold beyond said second preset threshold, said third preset threshold being set at a level corresponding to a warning state.

12. The system as recited in claim 9, wherein said second symbology comprises a circular band, said third symbology comprises a first segment extending outward from an outer circumference of said circular band, and said fourth symbology comprises a second segment extending outward from the outer circumference of said circular band.

13. The system as recited in claim 12, wherein said computer system is further configured to be capable of performing the following operations:
- acquiring a speed value representing a speed of the airplane; and
- causing said display unit to display at a present time an arc representing a future position of the airplane at a future time if the speed of the airplane remains constant at said speed value during a time interval from said present time to said future time.

14. The system as recited in claim 9, wherein said display unit is configured to send said computer system a signal in response to detection of pressure on a portion of said display screen displaying a portion of said second symbology, and said computer system is further configured to be capable of causing said display unit to display a checklist and a synoptics diagram on said display screen in response to receipt of said signal from said display unit.

* * * * *